(12) United States Patent
Fujiwara

(10) Patent No.: US 8,663,045 B2
(45) Date of Patent: Mar. 4, 2014

(54) SEAL CHAIN

(75) Inventor: Makoto Fujiwara, Osaka (JP)

(73) Assignee: Tsubakimoto Chain Company, Osaka (JP)

( * ) Notice: Subject to any disclaimer, the term of this patent is extended or adjusted under 35 U.S.C. 154(b) by 253 days.

(21) Appl. No.: 13/105,928

(22) Filed: May 12, 2011

(65) Prior Publication Data

US 2011/0294616 A1 Dec. 1, 2011

(30) Foreign Application Priority Data

Jun. 1, 2010 (JP) ................................. 2010-125961

(51) Int. Cl.
*F16G 13/06* (2006.01)
*F16G 13/02* (2006.01)

(52) U.S. Cl.
USPC .......................................................... 474/207

(58) Field of Classification Search
USPC .................. 474/207, 202, 206, 209
See application file for complete search history.

(56) References Cited

U.S. PATENT DOCUMENTS

| 2,411,214 | A | * | 11/1946 | Keech | 403/150 |
| 4,427,202 | A | * | 1/1984 | Backlin | 277/349 |
| 4,464,151 | A | * | 8/1984 | Kahl | 474/231 |
| 4,795,408 | A | * | 1/1989 | Kotegawa et al. | 474/209 |
| 5,222,920 | A | * | 6/1993 | Cheesman et al. | 474/213 |
| 5,269,729 | A | * | 12/1993 | Thuerman et al. | 474/207 |
| 5,425,679 | A | * | 6/1995 | Utz | 474/91 |
| 5,459,993 | A | * | 10/1995 | Kuriyama et al. | 59/4 |
| 5,468,376 | A | * | 11/1995 | Bates | 210/160 |
| 7,972,233 | B2 | * | 7/2011 | Fujiwara et al. | 474/209 |
| 2008/0124015 | A1 | * | 5/2008 | Fujiwara et al. | 384/484 |

FOREIGN PATENT DOCUMENTS

| JP | 5-1717 | 1/1993 |
| JP | 2008-157423 | 7/2008 |

* cited by examiner

*Primary Examiner* — William E Dondero
*Assistant Examiner* — Mark K Buse
(74) *Attorney, Agent, or Firm* — Stephen H. Eland; Dann, Dorfman, Herrell & Skillman

(57) ABSTRACT

There is provided a seal chain in which sealing performance of a seal mechanism is enhanced so as to be able to deal with a displacement radially of the connecting pins, and to be able to keep a sealing function for a long period of time even if highly fluid lubricant is used. Each seal mechanism comprises an inner circumferential ring fitted and fixed onto the end of the bush an annular seal receiving member disposed on the outer peripheral side of the inner circumferential ring so as to be movable in the radial direction and attached with an annular member enclosing a radial seal on the side of the outer link plate, a bellows seal extending between the inner circumferential ring and the annular seal receiving member and deformable in the radial direction and a seal ring provided on the side of the outer link plate facing to the inner link plate at the position corresponding to the annular radial sealing member concentrically with the pin to abut with the annular sealing member to seal the lubricant.

7 Claims, 7 Drawing Sheets

SEAL CHAIN

FIELD OF INVENTION

The present invention relates to a seal chain in which a seal mechanism is interposed between inner and outer link plates to prevent lubricant (such as lubricating oil, grease, solid lubricant) entrapped in a bearing portion composed of an outer peripheral surface of a pin and an inner peripheral surface of a bush from leaking to the outside and foreign materials, e.g., dust, from entering from the outside.

BACKGROUND OF THE INVENTION

Hitherto, a seal chain is used as transmitting and conveying means used in dusty atmosphere. The seal chain is provided with a seal mechanism which is interposed between inner and outer link plates to prevent lubricant such as grease entrapped in a bearing portion composed of an outer peripheral surface of a pin and an inner peripheral surface of a bush from leaking to the outside and foreign materials from entering from the outside. An annular resilient sealing member or an annular rigid sealing member such as an O-ring is used in general for the seal mechanism.

Still more, in order to improve the sealing function further, there is proposed a seal chain as shown in FIG. 7, having a seal mechanism 530 disposed between inner and outer link plates 511 and 521, which are both mounted on a pin 522 as shown in FIG. 7. The seal mechanism 530 includes a resilient ring 531, a seal ring 532 disposed outside of the resilient ring 531 and pressed against an opposed surface of the outer link plate 521, a tongued resin annular sealing member 533 disposed outside of the seal ring 532 and pressed against an opposed surface of the inner link plate 511, a ring-like plate 534 spaced from the outside of the tongued resin annular sealing member 533 and fixed to the opposed surface of the outer link plate 52. When the gap between the inner and outer link plates 511 and 521 fluctuates, for example when the seal chain 500 is in operation, the seal chain keeps its sealing performance by moving the seal mechanism 530 corresponding to the fluctuations of the gap between the inner and outer link plates 511 and 521. This movement is permitted by deformation of the resilient ring 531 and the tongued resin annular sealing member 533 or by a mutual sliding action between an inner peripheral surface of a base end portion of the tongued resin annular sealing member 533 and an outer peripheral surface of the seal ring 532, for example as disclosed in Japanese Patent Application Laid-open No. 2008-157423 and Japanese Utility Model Application Laid-open No. H5-1717.

However, although the seal mechanism 530 as described in Application No. 2008-157423 functions without trouble when the gap between the outer and inner link plates 521 and 511 changes in a direction of a center axis of the pin 522, i.e., in an axial direction (thrust direction), no consideration is given as for positional gap in a direction orthogonal to the direction of the center axis of the pin 522, i.e., in a radial direction which is the longitudinal direct of the chain.

While chains in general including a seal chain are used while being tensioned in a longitudinal direction, the chain elongates (extends) in the longitudinal direction when the chain is used in such a state for a long period of time.

One factor of such elongation is a gap (so-called misalignment) produced between the center axis of the pin 522 and a center axis of a bush 512 when the pin 522 and the bush 512 wear due to the tension applied in the longitudinal direction of the chain. However, no seal mechanism used in the prior art seal chains has been what takes special technological measures corresponding to the misalignment caused in the radial direction between the pin 522 and the bush 512.

Accordingly, if the misalignment as described above occurs in the prior art seal mechanism as described in Application No. 2008-157423, excessive force might be applied to the resilient ring 531 and the tongued resin annular sealing member 533, thus wearing or damaging the seal mechanism 530 and reducing the sealing performance. Due to that, it has been necessary to carry out maintenance works within a relatively short period of time.

Still more, relative positions of the outer and inner links normally change during operation of the chain and a volume of a spot where lubricant is entrapped such as a gap between the outer and inner link plates also always locally changes during operation of the chain.

Then, pressure often increases locally due to this local volume change.

Although the lubricant will not leak out of the seal mechanism in most cases, because the lubricant moves from a spot whose volume is reduced to another spot whose volume is increased, the movement of the lubricant becomes late in moving between the spots whose volumes fluctuate and the pressure often increases locally, though temporarily, if the fluctuation of the volume occurs in a short period of time. Accordingly, the prior art seal chain has a problem that the seal mechanism might be deformed and the lubricant might leak out if such increase of pressure occurs near the seal mechanism.

SUMMARY OF THE INVENTION

Accordingly, the present invention aims at solving the aforementioned prior art problems by providing a seal chain in which sealing performance of a seal mechanism is enhanced so as to be able to deal with a positional gap in a radial direction and to be able to keep a sealing function for a long period of time even if highly fluid lubricant is used.

In order to solve the aforementioned problems, according to a first aspect of the invention, there is provided a seal chain, having:

inner links in each of which both ends of a pair of bushes project and are fitted and fixed into bush holes of a pair of inner link plates, outer links in each of which both ends of a pair of pins are fitted and fixed into pin holes of a pair of outer link plates, the inner links and outer links being linked sequentially by idly fitting pins of the outer links respectively into the bushes of the two inner links adjacent in a longitudinal direction, and seal mechanisms disposed respectively between the inner and outer link plates to seal lubricant charged into respective bearing portions each composed of an inner peripheral surface of the bush and an outer peripheral surface of the pin, wherein each seal mechanism includes:

an inner circumferential ring fitted and fixed onto the end of the bush, an annular seal receiving member disposed on the outer peripheral side of the inner circumferential ring so as to be movable in the radial direction and attached with the annular radial sealing member on the side of the outer link plate, a bellows seal extended between the inner circumferential ring and the annular radial seal receiving member and deformable in the radial direction, and a seal ring provided on the side of the outer link plate facing to the inner link plate at position corresponding to the annular sealing member concentrically with the pin to abut with the annular sealing member to seal the lubricant.

According to a second aspect of the invention, the annular radial sealing member is provided with a fitting groove that fits the annular sealing member on the side of the outer link plate.

According to a third aspect of the invention, the annular seal receiving member is provided with a metallic annular member fitted into and attached to a fitting groove provided in the annular seal receiving member and a resilient lip for sealing lubricant by abutting with the side surface of the seal ring.

According to a fourth aspect of the invention, the seal mechanism is provided with an oil reservoir defined between the inner circumferential ring, the annular seal receiving member, the outer link plate and the bellows seal.

According to a fifth aspect of the invention, the annular seal receiving member is provided with a back surface sealing member on a surface thereof abutting with the inner link plate.

Because the seal chain of the invention has the inner links in each of which both ends of the pair of bushes project and are fitted and fixed into bush holes of the pair of inner link plates, the outer links in each of which both ends of the pair of pins are fitted and fixed into the pin holes of the pair of outer link plates, the inner links and outer links being linked sequentially by idly fitting the pins of the outer links respectively into the bushes of the two inner links adjacent in the longitudinal direction and the seal mechanisms disposed respectively between opposing surfaces of the inner and outer link plates to seal lubricant charged into the each bearing portion composed of the inner peripheral surface of the bush and the outer peripheral surface of the pin, the seal chain can prevent the lubricant from leaking to the outside and foreign materials from entering from the outside and has the following advantageous effects peculiar to the invention.

That is, according to the first aspect of the seal chain of the invention, because each seal mechanism includes the inner circumferential ring fitted and fixed onto the end of the bush, the annular seal receiving member disposed on the outer peripheral side of the inner circumferential ring so as to be movable in the radial direction and attached with the annular radial sealing member on the side of the outer link plate, the bellows seal extended between the inner circumferential ring and the annular seal receiving member and deformable in the radial direction, and the seal ring provided on the side of the outer link plate facing to the inner link plate at the position corresponding to the annular radial sealing member concentrically with the pin to abut with the annular sealing member to seal the lubricant, the bellows seal maintains to cover a positional gap between the annular sealing member and the seal ring even if the pin and the bush causes misalignment by deforming following the misalignment. Accordingly, it is possible to seal highly fluid lubricant effectively by maintaining the sealing function without applying excessive force to the annular sealing member, to improve durability of the seal chain and to make the seal chain maintenance-free consequently.

According to the second aspect of the seal chain of the invention, because the annular seal receiving member is provided with a fitting groove that fits the annular sealing member on the side of the outer link plate, the assembly attaching the annular sealing member to the annular seal receiving member can be simplified.

According to the third aspect of the seal chain of the invention, because the annular radial sealing member is provided with the metallic annular member fitted into and attached to the fitting groove provided in the annular seal receiving member and the resilient lip for sealing lubricant by abutting with the side surface of the seal ring, it becomes possible to attach the annular sealing member stably without causing slip-out with respect to the annular seal receiving member by the metallic annular member and the sealing function can be enhanced further by the resilient lip.

According to the fourth aspect of the seal chain of the invention, because the seal mechanism is provided with the oil reservoir defined between the inner circumferential ring, the annular seal receiving member, the outer link plate and the bellows seal, the oil reservoir functions as a lubricant buffering section even if the inner link and outer link move relatively in the radial direction during operation of the chain and even if volumes of a bearing portion composed of an outer peripheral surface of the pin and an inner peripheral surface of the bush and a gap between the end of the bush and the outer link plate fluctuate locally.

Because the lubricant is evacuated from a spot whose volume is locally reduced and displaced into the oil reservoir, and the lubricant is reversely supplied from the oil reservoir to a spot whose volume is locally increased, it becomes possible to steadily prevent the lubricant from leaking to the outside.

According to the fifth aspect of the seal chain of the invention, because the annular seal receiving member is provided with the back surface sealing member on the surface thereof abutting with the inner link plate, it becomes possible to prevent foreign materials from entering between the inner link plate and the annular seal receiving member. Accordingly, it becomes possible to reduce a possibility that the bellows seal is damaged by the foreign materials and to improve the durability of the whole seal chain.

BEST MODES FOR CARRYING OUT THE INVENTION

Figure 1:
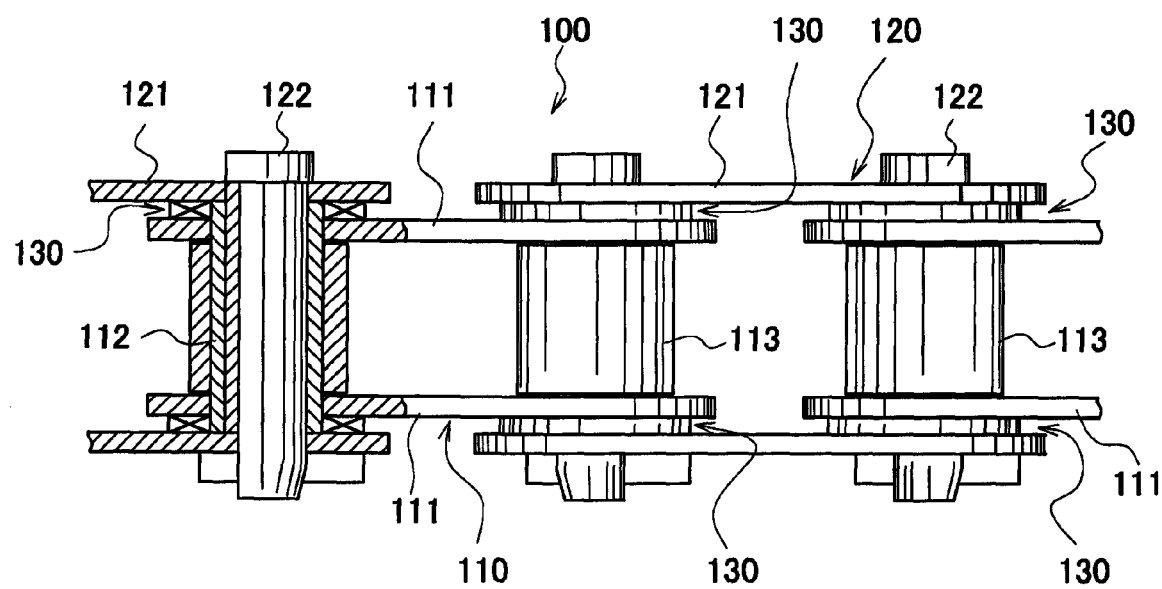
FIG. 1 is a schematic view of a seal chain of a first embodiment of the invention.
Figure 3:
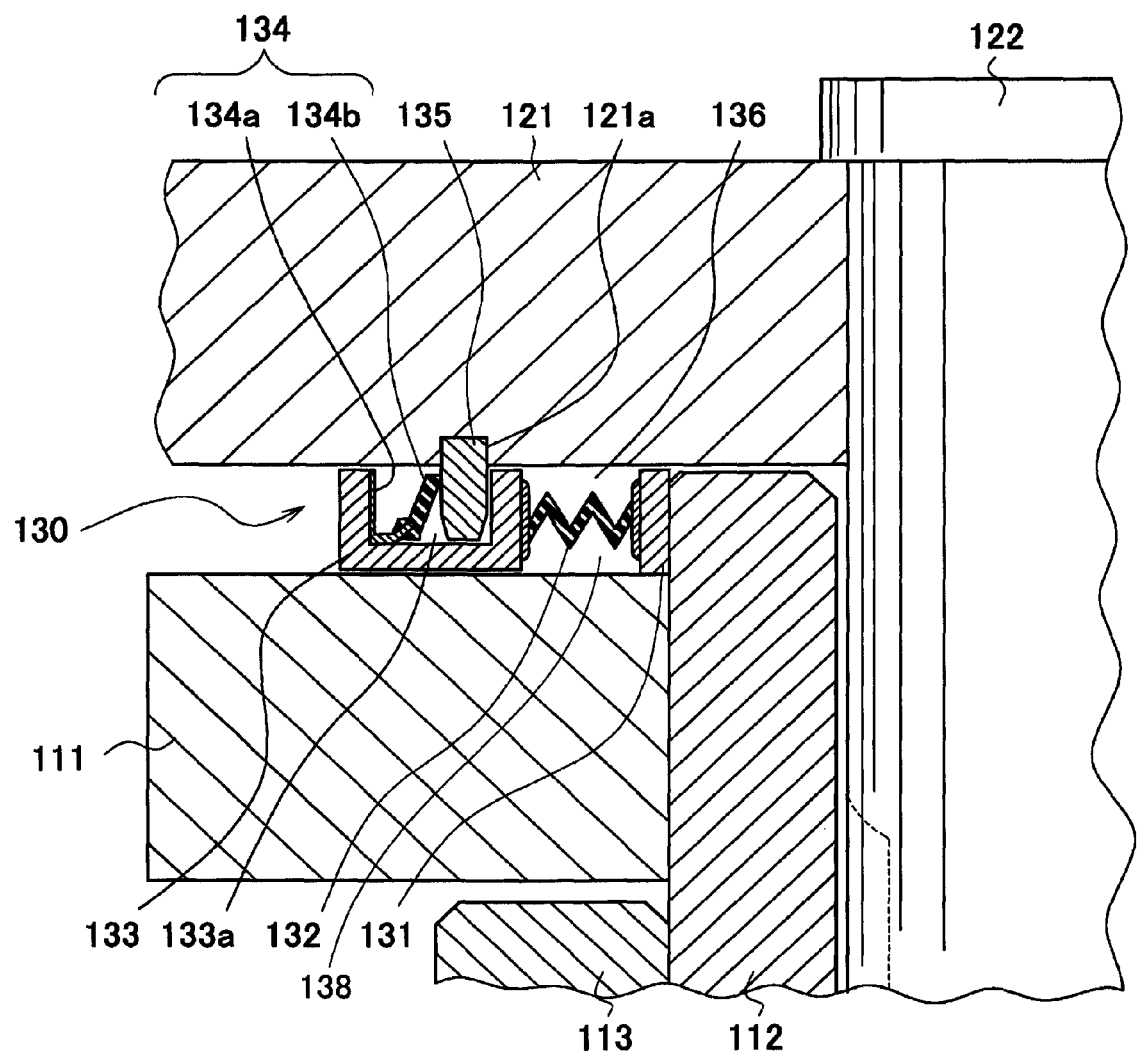
FIG. 3 is an enlarged sectional view of a main part of the seal chain shown in FIG. 2.
Figure 4:
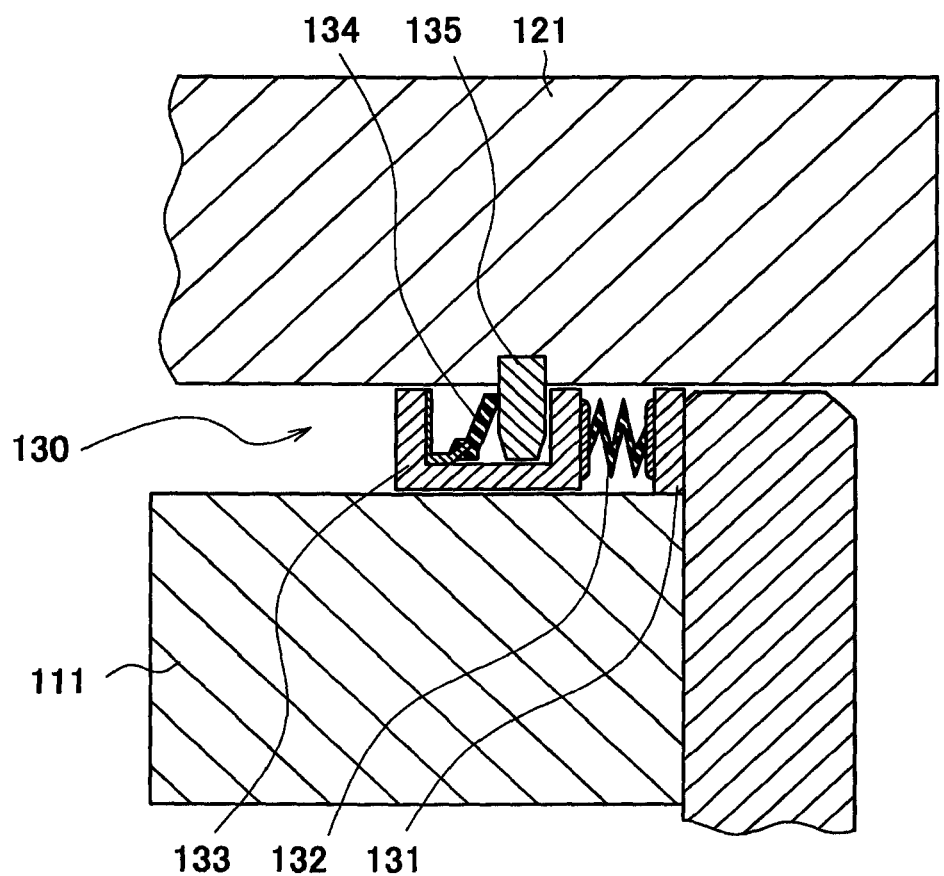
FIG. 4 is a view similar to FIG. 3 which is explanatory of operations of the seal chain shown in FIG. 2 when the lubrication reservoir housing the bellows seal is enlarged.
Figure 5:
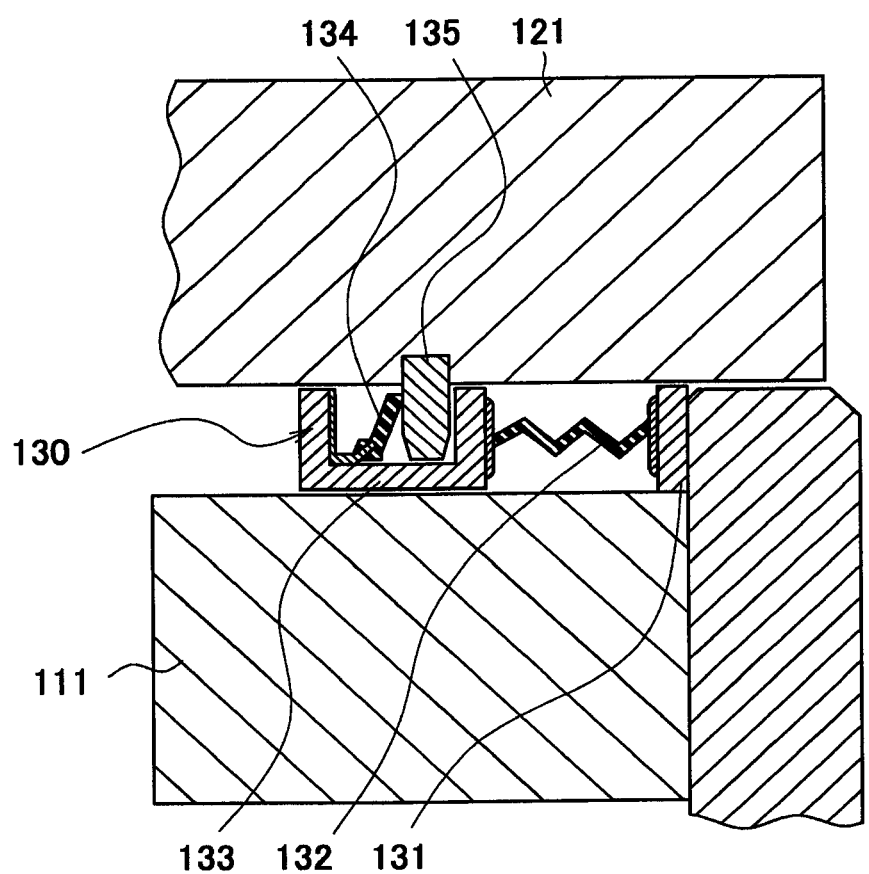
FIG. 5 is a view similar to FIG. 3 which is explanatory of operations of the seal chain shown in FIG. 2 when the lubrication reservoir housing the bellows seal is reduced.

A first embodiment of a seal chain of the invention will be explained with reference to FIGS. 1 through 5. FIG. 1 is a schematic view of the seal chain of the first embodiment, FIG. 2 is a section view of the seal chain shown in FIG. 1, FIG. 3 is an enlarged section view of a main part of the seal chain shown in FIG. 2 and FIGS. 4 and 5 are explanatory views of operations of the seal chain shown in FIG. 2.

As shown in FIG. 1, the seal chain 100 of the present embodiment is composed of inner and outer links 110 and 120 alternately linked with each other. That is, each inner link 110 is composed of a pair of inner link plates 111 separated in a direction orthogonal to a longitudinal direction of the chain, a pair of cylindrical bushes 112 whose both end portions project out of and are press-fitted into the inner link plates 111 and rollers 113 idly fitted around the bushes 112. Each outer link 120 is composed of a pair of outer link plates 121 separated in the direction orthogonal to the longitudinal direction of the chain on the outside of the pair of inner link plates 111 and pins 122 idly fitted into the bushes 112 and press-fitted into the pair of outer link plates 121. The axes of the pins 122 are orthogonal to the longitudinal direction of the chain. Still more, the seal chain 100 is provided with seal mechanisms 130 disposed respectively between the inner and outer link plates 111 and 121, i.e., between an outer side surface of the inner link plate 111 and an inner side surface of the outer link plate 121.

Figure 2:
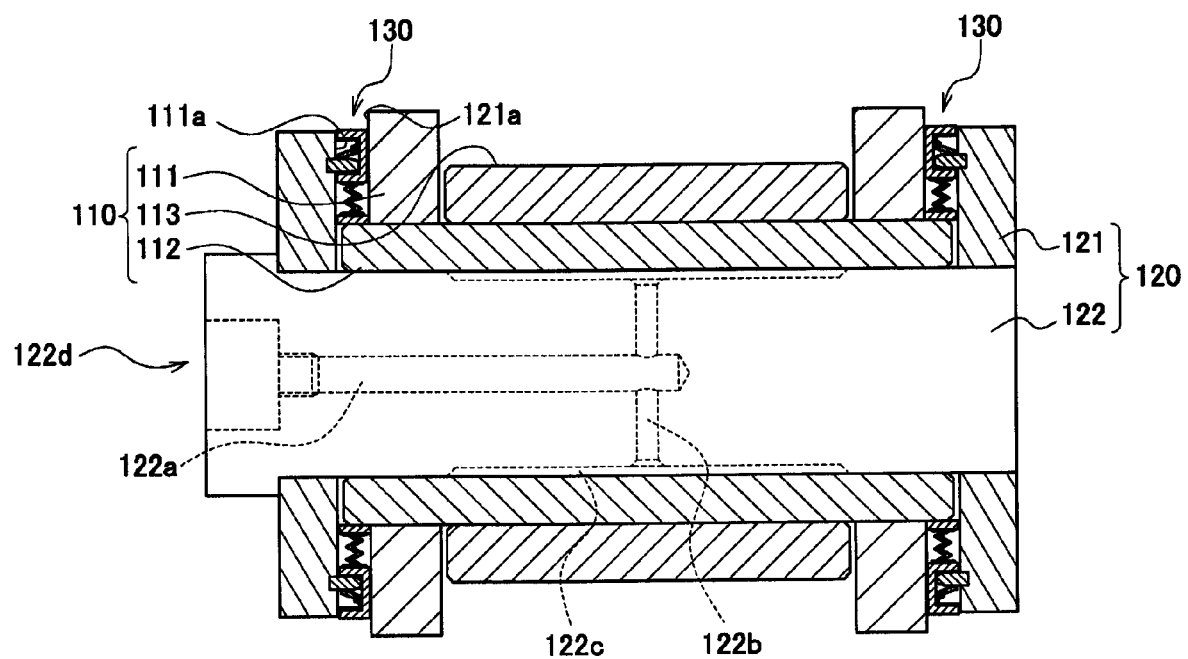
FIG. 2 is a cross-sectional view of the seal chain shown in FIG. 1.

As shown in FIG. 2, the pin 122 is provided with oil passages 122a and 122b therein and with concave grooves 122c that communicate with the oil passage 122b on an outer peripheral surface thereof so that a lubricant (grease, lubricant oil or others) is supplied from one end 122d of the pin 122 to a bearing portion composed of the inner peripheral surface of the bush 112 and the outer peripheral surface of the pin 122 via the oil passages 122a and 122b and the concave grooves 122c.

It is noted that the concave grooves 122c are not always necessary and may be provided appropriately according to need.

As shown in FIG. 3, the seal mechanism 130 includes a steel ring 131, i.e., an inner circumferential ring, press-fitted and fixed around an end of the bush 112 and a seal receiving ring 133, i.e., an annular seal receiving member, disposed concentrically with the bush 112 and the inner circumferential ring 131. The seal receiving ring 133 is provided with a fitting groove 133a in which a radial seal 134, i.e., an annular radial sealing member, can be anchored on the side of the outer link plate 121.

The radial seal 134 capable of sealing in a direction orthogonal to the axial direction of the outer link plate 121 and 112, i.e., in the radial direction, is attached to the seal receiving ring 133a by means of press-fitting or otherwise.

It is noted that the radial seal 134 is a metallic annular member 134a formed of metal and is provided with a resilient lip 134b made of rubber such as NBR. A seal similar to a dust seal conventionally used for bearings may be used.

The steel ring 131 described above is connected to the seal receiving ring 133 by a bellows seal 132 extending therebetween. The inner periphery of the bellows seal 132 is fixed to the outer periphery of the steel ring 131 by means of thermal bonding, adhesive or the like.

An outer periphery of the bellows seal 132 is also fixed to an inner periphery of the seal receiving ring 133 by means of thermal bonding, adhesive or the like in the same manner as described above.

The surface of the bellows seal 132 is formed into a patterned indented shape by soft rubber such as NBR, so that it is deformable both in the axial direction (thrust direction) and in the radial direction orthogonal to the axial direction with respect to the pin 122 or the bush 112.

The groove 133a of the ring 133 receives a seal ring 135 which is anchored in the outer link plate 21. The width of the groove 133a is greater than the width of the ring 133 and the seal 134 resiliently fills the remaining space. Accordingly, the seal receiving ring 133 is attached movably both in the radial and axial directions with respect to the bush 112. The resilience of the seal allows the ring to move relative to the fixed seal ring 135.

As shown in FIG. 3, the seal ring 135 is provided so as to fit into and erect from a fitting groove 121a provided on the inner side surface of the outer link plate 121 concentrically with the pin while facing to the radial seal 134 attached in the seal receiving ring 133.

The seal ring 135 is inserted into a position corresponding to the radial seal 134 so that the lip of the radial seal 134 abuts a side surface of the seal ring 135 in assembling the seal chain 100.

When the seal chain 100 is thus assembled, the resilient lip 134b of the radial seal 134 and the side surface of the seal ring 135 perform the sealing function in the radial direction.

The seal mechanism 130 of the seal chain of the first embodiment is constructed as described above and if the misalignment occurs between the pin 122 and the bush 112 as described above in the seal chain 100 mounted with such seal mechanism 130, positional gap occurs between the seal ring 135 and the bush 112 or the steel ring 131.

However, because the bellows seal 132 interposed between the seal receiving ring 133 and the steel ring 131 is deformable and the radial seal 134 and the seal receiving ring 133 move corresponding to the displacement of the seal ring 135, the radial seal 134 and the seal ring 135 cause no positional gap.

Accordingly, even if the misalignment occurs between the bush 112 and the pin 122 of the outer link plate 121, no positional gap occurs between the radial seal 134 and the seal ring 135, so that no excessive force acts on the radial seal 134 nor the seal ring 135 and the sealing function in the radial direction can be maintained.

FIGS. 4 and 5 show states when the misalignment occurs in the seal mechanism 130 of the seal chain 100 of the first embodiment. FIG. 4 shows the state in which the outer link 120 is moved to the right in FIG. 4 by the misalignment and the bellows seal 132 at that spot is compressed and FIG. 5 shows the state in which the outer link 120 is moved left in FIG. 5 by the misalignment and the bellows seal 132 at that spot is extended.

In any case, the bellows seal 132 respond to the displacement between the outer and inner links 120 and 110 caused by the misalignment by extending/being compressed as shown in FIGS. 4 and 5, so that the lip 134b of the radial seal 134 is not deformed.

The radial seal 134 is composed of the metallic annular member 134a having a diameter substantially equal to that of the fitting groove 133a formed in the seal receiving ring 133 and the lip 134b formed of a resilient member and projecting toward the seal ring 135.

Because the highly rigid metallic annular member 134a is used and the resilient radial seal 134 can be fitted into the fitting groove 133a of the seal receiving ring 133 which is also highly rigid by means of press-fitting and the like, the radial seal 134 can be attached to the seal receiving ring 133 simply and is not loosened unnecessarily.

A pressing force is generated when the lip 134b deforms or is deflected, thus improving the sealing function further, if the lip 134b is formed of the rubber-made resilient member such as NBR.

It is possible to select a high sealing performance material without considering that excessive force might be applied to the lip 134b because no positional gap occurs between the radial seal 134 and the seal ring 135 if the radial seal 134 is attached to the seal receiving ring 133 freely movable in the peripheral direction.

A space partitioned by the outer peripheral side of the steel ring 131, the seal receiving ring 133, the bush 112 and the outer link plate 121 is used as an oil reservoir 136 on the outer side of the bellows seal 132 and a grease reservoir 138 on the inner side of the bellows seal 132. The oil reservoir 136 communicates a bearing portion composed of the outer peripheral surface of the bush 112 and the inner peripheral surface of the pin 122 through a gap between the end of the bush 112 and the outer link plate 121 and the lubricant such as lubricant oil supplied to the bearing portion is supplied to the oil reservoir 136.

The oil reservoir 136 functions as a type of buffer for the lubricant such as the lubricant oil supplied to the bearing portion formed by the outer peripheral surface of the bush and the inner peripheral surface of the pin, as follows.

That is, it is possible to avoid pressure around the seal mechanism 130 from increasing temporarily even if a volume changes locally in an area like the bearing portion in which the lubricant is charged as described above when the oil reservoir 136 is provided like the first embodiment. That is, the lubricant existing in a spot whose volume is reduced is temporarily stored in the nearby oil reservoir 136 and the lubricant is also supplied to another spot whose volume is increased from the nearby oil reservoir 136.

Accordingly, because the oil reservoir 136 described above functions as a spot where the charged lubricant is evacuated temporarily, the lubricant will not leak from the lip 134b of the radial seal 134 to the outside.

Furthermore, the bellows seal 132 is relatively soft and is freely deformable, so that even if the outer and inner link plates 121 and 111 move relatively in the axial direction (thrust direction), the bellows seal 132 deforms accordingly and can maintain the sealing function.

Because the bellows seal 132 is deformable, the buffer function of the oil reservoir 136 described above functions effectively also to the volume fluctuation of the spot where the lubricant is charged that occurs when the outer and inner link plates 121 and 111 move relatively in the direction (thrust direction) axially of the pin 122.

As a result of improving the tightness of the seal mechanism 130 by using the highly stiff resilient member for the lip 134b and by providing the oil reservoir 136 as the lubricant buffering section, it becomes possible to use highly fluid lubricant such as lubrication oil.

According to the seal chain 100 of the first embodiment of the invention constructed as described above, because the sealing performance of the seal mechanism 130 is enhanced to be able to deal with the positional gap in the radial direction by having the steel ring 131 fitted and fixed into the end of the bush 112, the seal receiving ring 133 disposed on the outer peripheral side of the steel ring 131 so as to be movable in the radial direction and attached with the annular radial seal 134 on the side of the outer link plate 121, the bellows seal 132 extended between the steel ring 131 and the seal receiving ring 133 and deformable in the radial direction and the seal ring 135 provided on the side of the outer link plate 121 facing to the inner link plate 111 at the position corresponding to the radial seal 134 concentrically with the pin 122 to abut with the radial seal 134 to seal the lubricant, it is possible to maintain the sealing function for a long period of time even if the highly fluid lubricant is used.

Still more, because the highly stiff resilient member is used for the lip 134b and the oil reservoir 136 is provided as the lubricant buffering section, the sealing performance of the whole seal mechanism 130 is improved. As a result, it becomes possible to improve the lubricating performance between the inner peripheral surface of the bush 112 and the outer peripheral surface of the pin 122, to reduce the wear of the bush 112 and the pin 122 and to provide the highly durable seal chain. Thus, the advantageous effects of the seal chain of the invention are remarkable.

Next, a seal chain 200 of a second embodiment of the invention will be explained with reference to FIG. 6. Specific structures of the second embodiment are the same with the first embodiment, except of that a back surface sealing member 237 is provided at a surface where the inner link plate abuts with the seal receiving ring, i.e., the annular seal receiving member, so that an overlapped explanation thereof will be omitted here by denoting the same or corresponding members of the seal chain 100 of the first embodiment by reference numerals in 200s.

Figure 6:
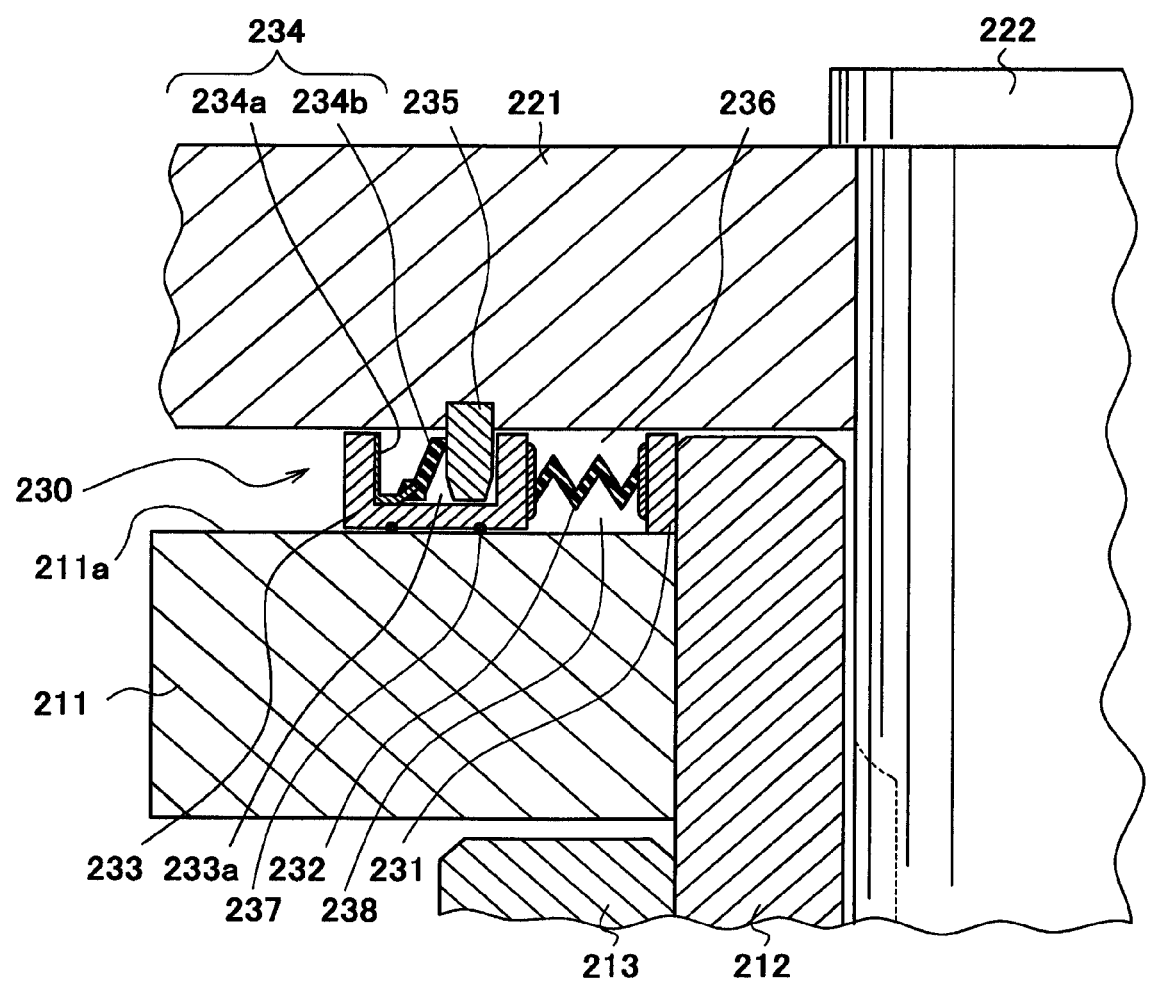
FIG. 6 is an enlarged section view of a main part of a second embodiment of the seal chain of the invention.
Figure 7:
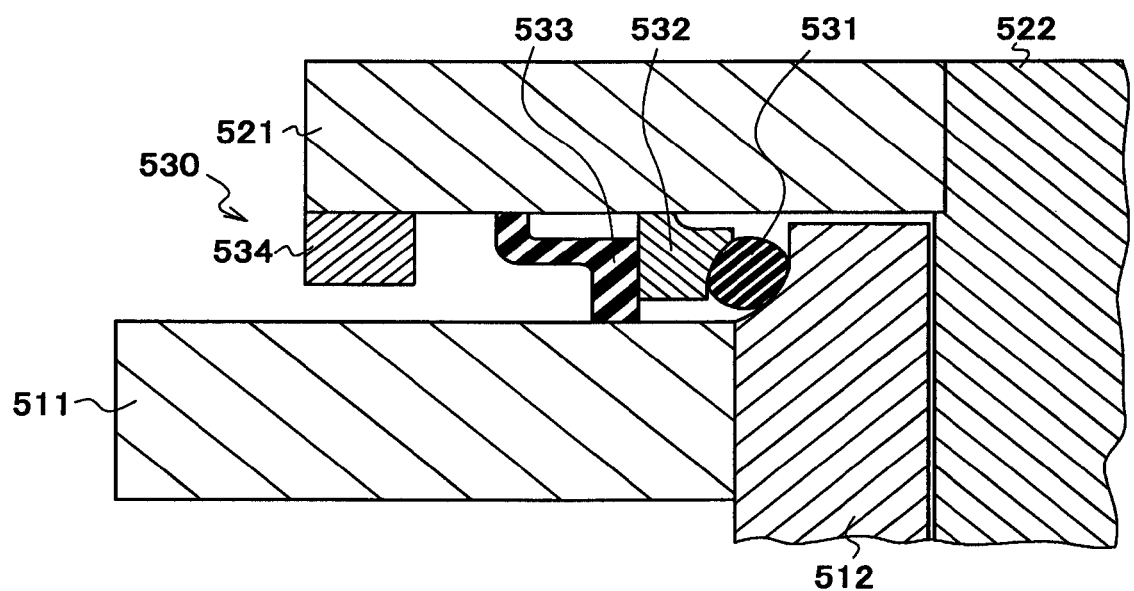
FIG. 7 is an enlarged section view showing a main part of a prior art seal chain.

FIG. 6 is an enlarged section view of a main part of the seal chain 200 of the second embodiment of the invention.

As shown in FIG. 6, while a seal mechanism 230 of the present embodiment is the same with that of the first embodiment in that the seal mechanism 230 has a steel ring 231, i.e., an inner circumferential ring, a bellows seal 232, a seal receiving ring 233, a radial seal 234 and a seal ring 235, the seal mechanism 230 is characterized in that the back surface sealing member 237, i.e., an annular seal like an O-ring, is provided on the side of the seal receiving ring 233 abutting with an inner link plate 211.

It is possible to prevent foreign materials from entering to the inner link plate side of the bellows seal 232 by providing the back surface sealing member 237.

Still more, if a space formed between the steel ring 231, the seal receiving ring 233, the inner link plate 211 and the bellows seal 232 is used as a grease reservoir 238 in which lubricant such as grease is filled, it becomes possible to reduce wear between the inner link plate 211 and the seal receiving ring 233 and to prevent foreign materials from entering to the inner link plate 211 side of the bellows seal 232.

Furthermore, it becomes possible to improve affinity between the back surface sealing member 237 and the inner link plate 211, to improve the seal between the annular sealing member 234 and the inner link plate 221 and make the grease reservoir 238 more effective and to reduce wear of the back surface of the sealing member 237.

It is noted that the sealing performance between the seal receiving ring 233 and the inner link plate 211 can be improved and the wear of the seal receiving ring 233 and the inner link plate 211 can be reduced, thus improving their durability, by providing the grease reservoir 238 whether or not the back surface sealing member 237 is provided.

The seal chain 200 of the second embodiment of the invention is constructed as described above. The seal of the seal mechanism 230 is enhanced to be able to deal with the positional gap in the radial direction by having the steel ring 231 fitted and fixed into the end of the bush 212. The seal receiving ring 233 is disposed on the outer peripheral side of the steel ring 231 so as to be movable in the radial direction and attached with the annular radial seal 234 on the side of the outer link plate 221. The bellows seal 232 is extended between the steel ring 231 and the seal receiving ring 233 and is deformable in the radial direction. The seal ring 235 is provided on the side of the outer link plate 221 facing to the inner link plate 211 at the position corresponding to the radial seal 234 concentrically with the pin 222 to abut with the radial seal 234 to seal the lubricant and the back surface sealing member 237 provided additionally at the surface where the seal receiving ring 233 abuts with the inner link plate 211. It is therefore possible to maintain the sealing performance for a long period of time even if the highly fluid lubricant is used.

In the seal chain of the second embodiment, the seal receiving ring 233 is provided with the back surface sealing member 237 at the surface where it abuts with the inner link plate 211, so that it becomes possible to prevent from foreign materials from entering between the inner link plate 211 and the seal receiving ring 233. Then, it becomes possible to reduce a possibility that the bellows seal 232 is damaged by the foreign materials and to improve the durability of the seal mechanism 230 further. Thus, the advantageous effects of the seal chain of the second embodiment are remarkable.

The specific mode of the seal chain of the present invention may take any mode as long as the seal chain has the inner links in each of which both ends of the pair of bushes project and are fitted and fixed into bush holes of the pair of inner link plates, the outer links in each of which both ends of the pair of pins are fitted and fixed into the pin holes of the pair of outer link plates, the inner links and outer links being linked sequentially by idly fitting the pins of the outer links respectively into the bushes of the two inner links adjacent in the longitudinal direction and the seal mechanisms disposed respectively between opposing surfaces of the inner and outer link plates to seal lubricant charged into the each bearing portion composed of the inner peripheral surface of the bush and the outer peripheral surface of the pin, wherein each seal mechanism includes the inner circumferential ring fitted and fixed into the end of the bush, the annular seal receiving member disposed on the outer peripheral side of the inner circumferential ring so as to be movable in the radial direction and attached with the annular radial sealing member on the side of the outer link plate, the bellows seal extended between the inner circumferential ring and the annular seal receiving member and deformable in the radial direction, and the seal ring provided on the side of the outer link plate facing to the inner link plate at the position corresponding to the annular sealing member concentrically with the pin to abut with the annular radial sealing member to seal the lubricant. As a result, the seal chain is highly sealed and can deal with the displacement in the radial direction and to be able to keep the sealing function for a long period of time even if highly fluid lubricant is used.

The chain itself that composes the seal chain may be a roller chain in which a roller is fitted around a bush as long as the seal mechanism can be disposed between inner and outer link plates.

Although various materials may be used for the inner circumferential ring as long as the materials are so rigid that can support the bellows seal and can be press-fitted into the bush, it is preferable to be steel-made considering strength, cost and other factors.

Various metals, synthetic resins and the like may be used for the annular seal receiving member as long as it can attach the seal in the radial direction and has abrasion resistance as against the outer and inner links, it is preferable to be steel-made similarly to the inner circumferential ring considering strength, abrasion resistance, workability, cost and other factors.

Still more, various metals, synthetic resins and the like may be used for the seal ring as long as it has such rigidity that can be press-fitted into the outer link plate and has hardness of a degree not wearing even if it slides mutually with the annular sealing member, it is preferable to be steel-made similarly to the inner circumferential ring and the annular seal receiving member considering strength, abrasion resistance, cost and others.

Although the bellows seal is formed of the resilient member having the intended surface profile, it can be formed into various shapes specifically as long as it is stretchable in the radial direction. The material of the bellows seal is preferably rubber, such as nitrile rubber (NBR), urethane rubber (polyurethane), chloroprene rubber, fluorine rubber (copolymer of propylene hexafluoride and vinylidene fluoride) and others from the aspects of oil resistance, heat resistance, stretch responsiveness and others.

Any means may be used in anchoring the inner circumferential ring with the bellows seal or the annular seal receiving member with the bellows seal as long as the bellows is anchored strongly without being disconnected from them even when the inner and outer links rotate. It is preferable to use thermal bonding and adhesive since they are simple.

The invention claimed is:

1. A seal chain, comprising inner and outer links, connecting pins and bushes, each having a proximal end and a distal end;
    each of said inner links comprising first and second inner link plates forming a pair of inner link plates having bush holes to mount first and second bushes, wherein the proximal end of the two bushes are fixed into bush holes of the first inner link plate and the distal end of the two bushes are fixed to bush holes of the second inner link plate;
    said outer links comprising first and second outer link plates arranged in pairs to connect adjacent inner links into said seal chain, wherein the first outer link of a pair is positioned adjacent the proximal end of the two bushes and the second outer link is position adjacent the distal end of the two bushes, said outer link plates having pin holes at each end, said connecting pins being fitted and fixed into said pin holes,
    said inner and outer links being linked sequentially by loosely fitting said connecting pins of said outer links respectively into the bushes of the two inner links adjacent in a longitudinal direction, the bushes having interior peripheral surfaces receiving the outer peripheral surfaces of said pins, the outer surface of said first inner link plate confronting the inner surface of said first outer link plate in spaced relation to provide a lubricant-receiving space therebetween; and
    seal mechanisms disposed respectively between said confronting surfaces of the first inner and first outer link plates to define a reservoir for lubricant connected to the space between an inner peripheral surface of said bush and an outer peripheral surface of said pin;
    said each seal mechanism comprising:
    an inner circumferential ring fitted and fixed onto the end of the bush and having a surface confronting said lubricant-receiving space;
    an annular seal-receiving member spaced from said inner circumferential ring, and an annular radial seal in said seal-receiving member so as to be movable in a direction radially of said pin said seal receiving member with the annular radial sealing member being mounted on the inside of the outer link plate;
    a bellows seal extended between the inner circumferential ring and the annular seal receiving member and deformable in the radial direction of said pin; and
    a seal ring provided on the side of the outer link plate facing to the inner link plate at position corresponding to the position of said annular radial sealing member concentrically with the pin to abut with the annular sealing member to seal the lubricant reservoir.

2. The seal chain according to claim 1, wherein said annular seal receiving member is provided with a fitting groove facing said inner surface of said outer link, said groove receiving said annular radial seal ring on the side of said outer link plate.

3. The seal chain according to claim 2, wherein said annular radial sealing member is provided with a metallic annular member fitted into and attached to said fitting groove and a resilient lip for sealing lubricant reservoir by abutting with the side surface of said seal ring.

4. The seal chain according to claim 3 wherein said groove has width to accommodate the width of said annular seal ring and said resilient lip, to allow limited radial displacement of said seal-receiving member upon deflection of said resilient lip.

5. The seal chain according to claim 1, wherein said reservoir is defined by said inner circumferential ring, said annular seal receiving member, said outer link plate and said bellows seal.

6. The seal chain according to any one of claim 1, wherein said annular seal receiving member has a back surface abutting with said inner link plate, and at least one sealing member on said back surface.

7. The seal chain according to claim 6, wherein said back surface comprises a hollow cylindrical surface having at least one circumferential groove receiving said sealing member, ceiving said sealing member.

* * * * *

UNITED STATES PATENT AND TRADEMARK OFFICE
CERTIFICATE OF CORRECTION

PATENT NO.        : 8,663,045 B2                                              Page 1 of 1
APPLICATION NO.   : 13/105928
DATED             : March 4, 2014
INVENTOR(S)       : Fujiwara It is certified that error appears in the above-identified patent and that said Letters Patent is hereby corrected as shown below:

In the Claims

Column 11, Claim 7, line 14, "receiving said sealing member, ceiving said sealing member." should read -- receiving said sealing member. --.

Signed and Sealed this
Fourteenth Day of October, 2014

Michelle K. Lee
*Deputy Director of the United States Patent and Trademark Office*